Sept. 15, 1964   H. L. GRINSTEAD   3,148,899
JUNCTION BOX CONNECTOR
Filed June 8, 1961
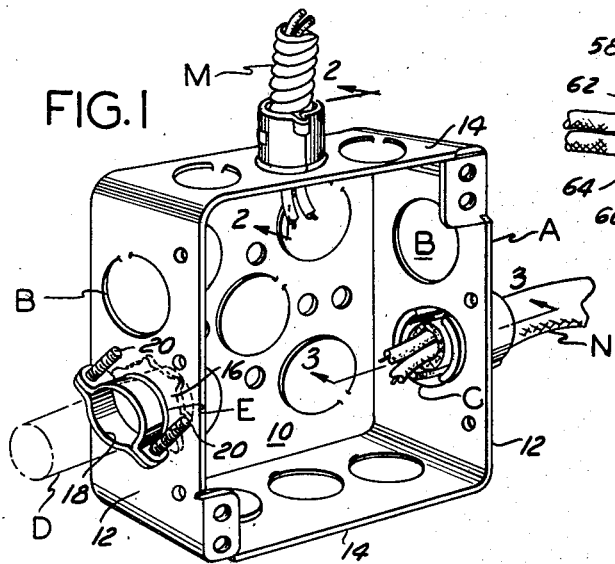
FIG. 1
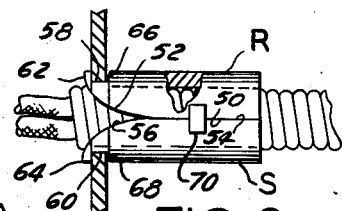
FIG. 6
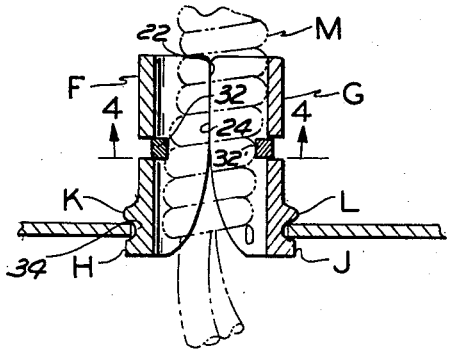
FIG. 2
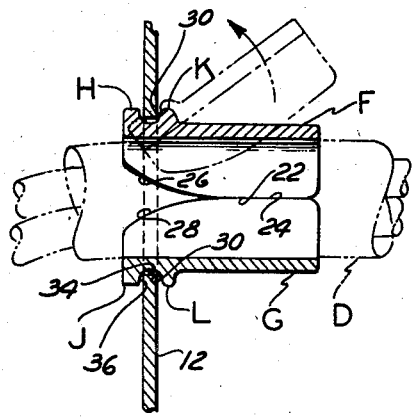
FIG. 3
FIG. 4
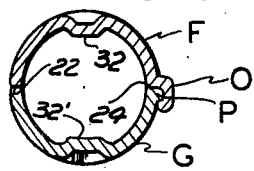
FIG. 5
INVENTOR.
HENRY LEE GRINSTEAD
BY
ATTORNEY United States Patent Office 3,148,899
Patented Sept. 15, 1964

3,148,899
JUNCTION BOX CONNECTOR
Henry Lee Grinstead, 4705 Oakfield St., Santa Ana, Calif.;
Aline C. Grinstead, legal heir of said Henry L. Grinstead, deceased
Filed June 8, 1961, Ser. No. 115,644
1 Claim. (Cl. 285—159)

The present invention relates generally to the field of electrical equipment, and more particularly to a connector for use in removably holding an end portion of an elongate member such as conduit, Romex, or the like, in a fixed position relative to a junction box.

In the electrical wiring of modern homes and commercial buildings, either flexible conduit that is spirally wound is used to sheath one or more insulated electrical conductors disposed therein, or Romex is employed for this purpose. Both the flexible conduit and Romex are of substantially the same transverse cross section.

In the wiring of a building, junctions are made between the electrical conductors, and junction boxes are provided for this purpose, with the conduit or Romex extending through knock-out openings formed in the sides of the boxes. Prior to the present invention, clamps have been provided to engage those portions of the walls of the junction box adjacent the openings therein, with the clamps also frictionally engaging the exterior end portions of the conduit or Romex. The actual splicing or connection of the electrical conductors is effected within the confines of the junction box. The use of such clamps has a number of disadvantages, for the clamps are difficult to position on the end portions of the conduit or Romex, difficult to affix to the junction box, are expensive, time-consuming to install, and require the use of hand tools.

A major object of the present invention is to provide a connector that is removably attachable to a junction box and capable of frictionally engaging the end portion of a tubular member without the use of hand tools, and will substantially eliminate the operational disadvantages of the above-mentioned clamps.

Another object of the invention is to provide a structurally simple connector that may be snapped into a tubular member holding position, is simple and easy to install, can be manufactured from standard commercially available equipment, and due to its low cost of manufacture, can be retailed at a sufficiently low price as to encourage its widespread use.

Yet another object of the invention is to provide a connector, which due to the rapidity with which it may be installed, will appreciably lessen the time required in making a wiring installation in either a home or commercial building.

These and other objects and advantages of the present invention will become apparent from the following description of a preferred and an alternate form thereof, and from the drawing illustrating the same in which:

FIGURE 1 is a perspective view of a junction box having knock-out sections in the walls thereof, three of which sections have been removed to illustrate how flexible conduit and Romex can be held in a fixed position relative to the box by use of the connector, and also how a tubular member is held in a fixed position relative to the box by use of a clamp available on the present day market;

FIGURE 2 is a longitudinal cross-sectional view of the junction box connector shown holding a flexible conduit in a fixed position relative to the junction box, taken on line 2—2 of FIGURE 1;

FIGURE 3 is a longitudinal cross-sectional view of the connector shown holding an end portion of Romex cable in a fixed position relative to the junction box, taken on line 3—3 of FIGURE 1;

FIGURE 4 is a transverse cross-sectional view of the connection taken on line 4—4 of FIGURE 2;

FIGURE 5 is a perspective view of the connector; and

FIGURE 6 is a side-elevational view of a first alternate form of the connector.

With continued reference to the drawings, a conventional junction box A is shown in FIGURE 1 which comprises a wall 10, two end walls 12, and two side walls 14. The wall 10, end walls 12 and side walls 14 have scored sections B formed therein, each of which are adapted to be knocked out of the box when a sharp blow is imparted thereto. When each section B is knocked out of the junction box a circular opening C is created. Although junction boxes are manufactured by a number of manufacturers, the dimensions thereof are standardized, whereby the openings C in a box are always of the same diameter.

In the past, a tubular member D that contains one or more electrical conductors (not shown) has had an end portion thereof held at a fixed position relative box A by the clamp E shown on the left in FIGURE 1. The clamp E as may be seen is of a complicated structure and included a body 16 that was partially inside box A, but extended through one of the openings C, and two clamp bars 18 that where held in a clamping position by two screws 20. Clamps E of the structure above-described are unsatisfactory for the reasons previously mentioned.

The invention as may best be seen in FIGURES 2 to 5 inclusive includes first and second semi-cylindrical shells F and G respectively. The first shell F has two straight edges 22 that may be disposed in abutting contact with two straight edges 24 of the second shell G.

The forward ends of edges 22 and 24 of the shells F and G develop into curved edges 26 and 28 respectively, which curve outwardly away from one another for reasons that will later become apparent. First semi-circular flanges H and J are formed on the forward ends of shells F and G, which flanges are transversely aligned when the connector is disposed as shown in solid line in FIGURE 3. Second semi-circular flanges K and L project outwardly from the shells F and G respectively, and are situated rearwardly on the shells a distance slightly greater than the thickness of one of the end walls 12. The forward faces 20 of the second flanges K and L taper upwardly and rearwardly to permit the pivotal movement of first flange H from the position shown in phantom line to the position shown in solid line in FIGURE 3.

Protuberances 32 and 32' are provided on shells F and G that extend inwardly to frictionally engage the exterior surface of either a flexible conduit M shown in the upper portion of FIGURE 1 or a Romex cable N shown on the right in FIGURE 1. Protuberances 32 and 32' are conveniently provided by forming two spaced slits (not shown) transversely in the shells F and G, and then forcing the portions of the shells between the slits inwardly, as shown in FIGURE 2. A circumferentially extending surface 34 situated between the forward faces 30 of flanges K and L and the rear faces 36 of flanges H and J is of slightly less diameter than that of one of the openings C, and slightly longer than the thickness of the wall 10, 12 or 14 in which the opening C is situated.

One rear exterior side portion of first shell F adjacent one of the edges 22 thereof has an engaging member O in the form of a hook projecting outwardly therefrom. The engaging member O is capable of removably engaging an engageable member P in the form of a lug projecting outwardly from a rear side portion of the second shell G.

Operation of the connector is extremely simple. The second shell G is disposed relative to junction box A as shown in FIGURE 3, with the flanges J and L thereof engaging portions of the wall 12 adjacent opening C. The first shell F is then positioned as shown in phantom line in FIGURE 3 whereby the flanges H and K engage portions of the wall 12 adjacent opening C. Thereafter an end portion of tubular member D is extended between shells F and G, and through opening C into the confines of the box A. The first shell F is then pivoted downwardly from the position shown in phantom line to that shown in solid line in FIGURE 3 wherein the engaging member O and engaging member P are in engagement when the edges 22 and 24 of the shells are in abutting contact. When the shells are disposed as shown in phantom line in FIGURE 3, the protuberances 32 and 32' frictionally grip the exterior surface of member D and prevents longitudinal movement thereof relative to junction box A.

A first alternate form of the invention is shown in FIGURE 6 that serves the same function as the preferred form of the connector. This first alternate form of connector includes first and second semi-cylindrical shells R and S respectively. A rearwardly disposed longitudinally extending edge 50 is formed on each side of shell R, which edges develop into forwardly disposed outwardly curving edges 52. Second shell S also has longitudinally extending rearward edges 54 similarly formed thereon that may be placed in abutting contact with edges 50, as shown in FIGURE 6. Edges 54 develop into forwardly disposed curved edges 56, and the edges 52 and 56 curve outwardly in opposite directions.

The forward portions of shells R and S are undercut on the exterior thereof to define two portions 58 and 60 which are of lesser thickness than the balance of the shells. The forward parts of portions 58 and 60 project outwardly in oposite directions to define two flanges 62 and 64. The rear extremities of portions 58 and 60 are defined by two transversely extending body shoulders 66 and 68 respectively. Means 70 for removably locking the shells R and S together are provided (FIGURE 6). The means 70 are of the same construction as the engaging member O and engageable member P, as shown in FIGURE 4.

The first alternate form of connector is used in the same manner as the preferred form. Flanges 62 and 64 engage the interior surface of that portion of the sheet in which the opening C is formed, and the shoulders 66 and 68, the exterior surfaces thereof. The interior surfaces of shells R and S frictionally engage the cable or Romex extending therebetween, or if desired, protuberances (not shown) on the interior of shells R and S can be provided to frictionally engage the cable or Romex.

It will be obvious to those skilled in the art that various changes may be made in the invention without departing from the spirit and scope thereof, and therefore the invention is not limited by that which is shown in the drawing and described in the specification, but only as defined in the appended claim.

I claim:

A manually operable connector for removably holding one end portion of an elongate member in an opening formed in a junction box without the use of tools, comprising: a first semi-cylindrical shell having two first straight longitudinally extending edges, the forward ends of which develop into two forwardly and outwardly curving second edges, said first shell having first and second longitudinally spaced, transversely disposed flanges which project outwardly from the exterior surface thereof adjacent said second edges with the arcuate length of said first flange being such as to permit it to be moved through said opening into said junction box; a second semi-cylindrical shell having two first straight longitudinally extending edges that can abut against said straight edges of said first shell, with the forward ends of said first edges of said second shell developing into two forwardly and outwardly curving second edges that may be moved into rolling contact with said second edges of said first shell, said second shell having first and second longitudinally spaced, transversely disposed flanges that project outwardly from the exterior surface thereof which are in transverse alignment with said first and second flanges of said first shell when said first edges of said first and second shells are in contact, said first and second flanges of said second shell being of substantially the same dimensions as that of said first and second flanges on said first shell, with the external diameters of said first and second flanges on said first and second shells being greater than that of said opening when said straight edges of said shells are in abutting contact; first means for removably holding said first edges of said shells in abutting contact after said second edges have been rolled relative to one another to dispose said first and second flanges on opposite sides of said wall of said junction box; at least one protuberance that extends outwardly from said first shell; and a resilient hook-shaped member which projects from said second shell, which hook-shaped member snaps over said protuberance and interlocks therewith when said first edges are in abutting contact.

References Cited in the file of this patent

UNITED STATES PATENTS

| | | |
|---|---|---|
| 297,264 | Hunt | Apr. 22, 1884 |
| 1,228,323 | Hudgins | May 29, 1917 |
| 2,468,854 | Woodring | May 3, 1949 |

FOREIGN PATENTS

| | | |
|---|---|---|
| 533,297 | Canada | Nov. 20, 1956 |